United States Patent
Lee et al.

(10) Patent No.: US 7,602,833 B2
(45) Date of Patent: Oct. 13, 2009

(54) APPARATUS AND METHOD FOR GENERATING SPREADING CODE USING JACKET MATRIX AND CODE CHANNEL SPREADING DEVICE USING THE SAME

(75) Inventors: Moon-Ho Lee, Jeonju-si (KR); Jia Hou, Jeonju-si (KR)

(73) Assignees: Electronics and Telecommunications Research Institute, Daejon (KR); Industrial Cooperation Chonbuk National University, Jeonju-si, Jeollabuk-do (KR)

(*) Notice: Subject to any disclaimer, the term of this patent is extended or adjusted under 35 U.S.C. 154(b) by 618 days.

(21) Appl. No.: 11/144,781

(22) Filed: Jun. 6, 2005

(65) Prior Publication Data

US 2006/0171444 A1    Aug. 3, 2006

(30) Foreign Application Priority Data

Feb. 2, 2005  (KR) .................. 10-2005-0009332
Mar. 14, 2005 (KR) .................. 10-2005-0020876

(51) Int. Cl.
    *H04B 1/00* (2006.01)
(52) U.S. Cl. ..................................... 375/130
(58) Field of Classification Search .............. 375/130
    See application file for complete search history.

(56) References Cited

U.S. PATENT DOCUMENTS

| | | | |
|---|---|---|---|
| 7,012,886 B2 * | 3/2006 | Meier et al. ............. | 370/209 |
| 2002/0172168 A1 | 11/2002 | Meier et al. | |
| 2003/0210648 A1 * | 11/2003 | Yang et al. ............. | 370/208 |
| 2005/0020237 A1 * | 1/2005 | Alexiou et al. ........... | 455/403 |
| 2006/0109897 A1 * | 5/2006 | Guo et al. ............... | 375/232 |
| 2008/0059551 A1 * | 3/2008 | Van Berkel et al. ....... | 708/490 |

FOREIGN PATENT DOCUMENTS

| | | |
|---|---|---|
| CA | 2379720 | * 11/2002 |
| KR | 1020000022992 | 4/2000 |
| KR | 1020000026790 | 5/2000 |
| KR | 1020000057763 | 9/2000 |
| KR | 1020020061672 | 7/2002 |
| KR | 1020050102379 | 10/2005 |
| KR | 1020060022844 | 3/2006 |

OTHER PUBLICATIONS

Jia Hou and Moon Ho Lee, "Construction of Dual OVSF Codes with Lower Correlations," IEICE Trans. Fundamentals, vol. E89-A, No. 11 Nov. 2006.*

(Continued)

*Primary Examiner*—David C Payne
*Assistant Examiner*—Nader Bolourchi
(74) *Attorney, Agent, or Firm*—Lowe Hauptman Ham & Berner, LLP

(57) ABSTRACT

Provided is a spreading code generating apparatus using a jacket matrix, a method thereof, and a code channel spreading device using the same. The present research provides an apparatus for generating a spread quasi-orthogonal function, which is a spreading code, by using a jacket matrix and a known short bent sequence, a method thereof, and a code channel spreading device that can acquire a minimum level of transmission power and a fine multiple access error probability in a multi-user system. The apparatus includes: a spreading code generating block for generating a spreading code by using a jacket matrix; and a spreading block for spreading external user data by using the spreading code, wherein the jacket matrix is an orthogonal matrix where an inverse matrix for a square matrix of a predetermined size having elements without zero includes inverses and transposes on an element basis.

21 Claims, 11 Drawing Sheets

OTHER PUBLICATIONS

Kyeongcheol Yang, et al.; "Quasi-Orthogonal Sequences for Code-Division Multiple-Access Systems"; IEEE Transactions on Information Theory, vol. 46, No. 3; May 2000; pp. 982-993.

Jia Hou; et al.; "Extended Quasi-Orthogonal Sequences on Jacket Matrices"; 2005 IEEE; International Conference on Personal Wireless Communication; Jan. 23-25, 2005; pp. 116-119.

* cited by examiner

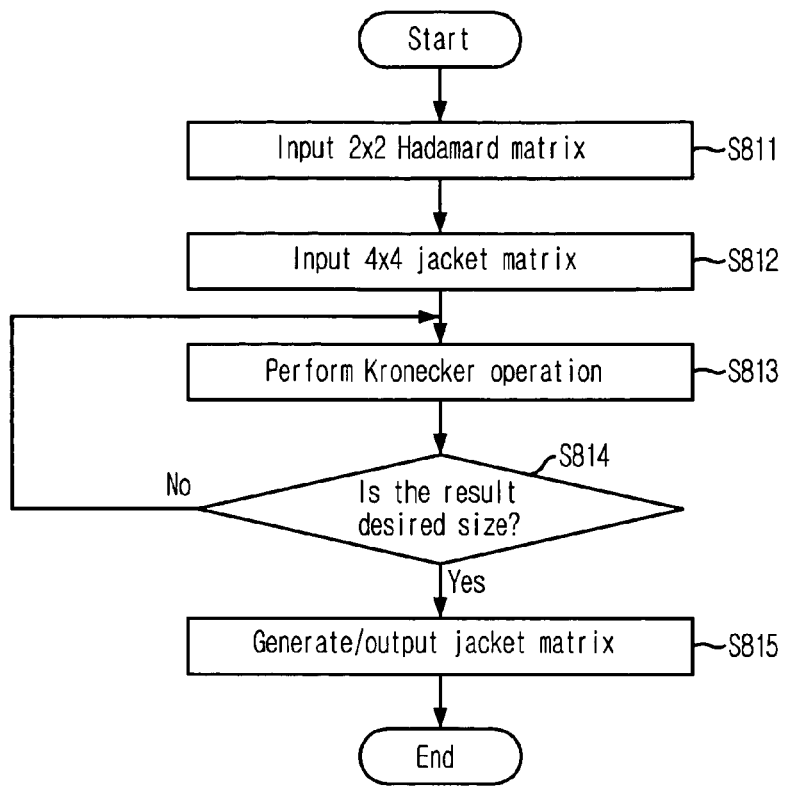

US 7,602,833 B2

APPARATUS AND METHOD FOR GENERATING SPREADING CODE USING JACKET MATRIX AND CODE CHANNEL SPREADING DEVICE USING THE SAME

FIELD OF THE INVENTION

The present invention relates to a spreading code generating apparatus using a jacket matrix, a method thereof, and a code channel spreading device using the same; and, more particularly, to an apparatus for generating a spread quasi-orthogonal function, which is a spreading code, by using a jacket matrix, a method thereof, and code channel spreading device using the spreading code generating apparatus.

DESCRIPTION OF RELATED ART

A third-generation (3G) Code Division Multiple Access (CDMA) system and a wireless network are applied to diverse environments for various purposes and they are expected to call for diverse services that call for a high data transmission rate.

One of the recent developments is a High Data Rate (HDR), which is an advanced form of the IS-2000 which supports a high data transmission rate efficiently in a 1.25 MHz spectrum band. The HDR is proposed in an article by P. Bender, entitled "CDMA/HDR: A bandwidth efficient high speed wireless data service for nomadic users," *IEEE Commun. Mag.* Vol. 38, No. 7, pp. 70-77, July 2000.

Also, in order to support a mixed high-rate data service efficiently as well as a low-rate data speech service within the same band, various methods including 1XEV-DV, which is an advanced edition of the IS-2000, and a High-Speed Downlink Packet Access (HSDPA), which is an advanced edition of the WCDMA, are standardized. According to the standards, the maximum high data transmission rate is achieved by Walsh codes and combinations of high-degree modulation methods, such as 8-Phase Shift Keying (PSK), 16-Quadrature Amplitude Modulation (QAM), and 64-QAM.

In spreading codes, a cross-correlation value between spreading codes should be the minimum. Since the cross-correlation value between Walsh codes is 0, the Walsh codes are optimal as spreading codes.

However, there are only N Walsh codes whose length is N. Thus, if more than N spreading codes are needed to discriminate channels, there is a problem that no more Walsh codes can be allocated.

The problem hardly occurs in a system with small numbers of channels and the kinds of channels, such as a pilot channel, a paging channel, a synchronization (sync) channel, and a traffic channel. However, it is highly likely to occur in a system that requires many kinds of channels, such as an International Mobile Telecommunication 2000 (IMT-2000) system.

In addition, when a spreading factor becomes small, the number of available Walsh codes becomes very small. If there is a system lack of Walsh codes because it used up all Walsh codes, the system needs new spreading codes to substitute the Walsh codes and thus provide all services to users after the exhaustion of the Walsh codes. In other words, it needs to prepare additional spreading codes having the next minimum interference.

A QOF signal is a signal used as an additional spreading code, when all the Walsh codes are allocated to existing channels. The QOF signal has an excellent cross-correlation with a Walsh code and it also has excellent cross-correlation properties with another QOF signal. The size of a Walsh code set can be enlarged to improve the communication capacity of a transmission system. Therefore, it is required to realize new spreading codes that can be used to substitute or together with Walsh codes by using the QOF.

SUMMARY OF THE INVENTION

It is, therefore, an object of the present invention to provide an apparatus for generating a spread quasi-orthogonal function, which is a spreading code, by using a jacket matrix and a known short bent sequence, a method thereof, and a code channel spreading device that can acquire a minimum level of transmission power and a fine multiple access error probability in a multi-user system such as a Code Division Multiple Access (CDMA) system.

It is another object of the present invention to provide a method for simply generating a Quasi-Orthogonal Function (QOF) having a low cross-correlation level in a jacket matrix, a method for generating diverse QOF mask function families through simple spreading from a known short bent sequence into a long bent sequence, and a code channel spreading device that can increase the number of available code channels without modifying a conventional code spreader.

In accordance with an aspect of the present invention, there is provided a code channel spreading device for using a spread quasi-orthogonal function generated, which includes: a spreading code generating block for generating a spreading code by using a jacket matrix; and a spreading block for spreading external user data by using the spreading code generated in the spreading code generating block.

In accordance with another aspect of the present invention, there is provided a spreading code generating apparatus using a jacket matrix, which includes: a jacket matrix generating unit for generating a jacket matrix; a mask function generating unit for generating a mask function; and a Hadamard operating unit for generating a spreading code by receiving the jacket matrix and the mask function generated in the jacket matrix generating unit and the mask function generating unit, respectively, and performing Hadamard operation.

In accordance with another aspect of the present invention, there is provided a method for generating a spreading code by using a jacket matrix, which includes the steps of: a) generating a jacket matrix; b) generating a mask function; and c) generating a spreading code by using the jacket matrix and the mask function.

Herein, the jacket matrix is an orthogonal matrix where an inverse matrix for a square matrix of a predetermined size having elements without zero includes inverses and transposes on an element basis.

BRIEF DESCRIPTION OF THE DRAWINGS

The above and other objects and features of the present invention will become apparent from the following description of the preferred embodiments given in conjunction with the accompanying drawings, in which:

FIG. 8 is a flowchart illustrating a jacket matrix generating process in accordance with an embodiment of the present invention;

FIG. 9 presents a JQOF structure in accordance with an embodiment of the present invention;

DETAILED DESCRIPTION OF THE INVENTION

Other objects and aspects of the invention will become apparent from the following description of the embodiments with reference to the accompanying drawings, which is set forth hereinafter. If it is determined that further description on a prior art related to the present invention is thought to blur the points of the present invention, it will not be provided herein. Hereinafter, preferred embodiments of the present invention will be described in detail with reference to the accompanying drawings.

Figure 1:
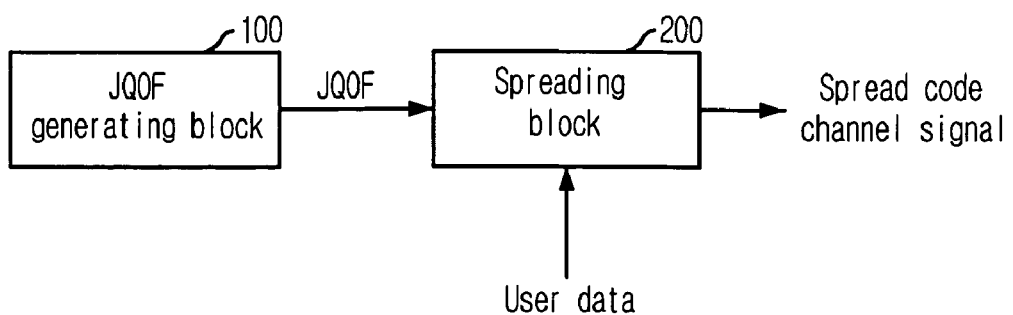
FIG. 1 is a block diagram showing a code channel spreading device in accordance with an embodiment of the present invention.

FIG. 1 is a block diagram showing a code channel spreading device in accordance with an embodiment of the present invention. As shown, the code channel spreading device of the present invention includes a Jacket Quasi-Orthogonal Function (JQOF) generating block 100 for generating a JQOF, which is a spreading code, and a spreading block 200 for spreading user data inputted from the outside by using the JQOF and outputting a spreading code channel signal.

Figure 2:
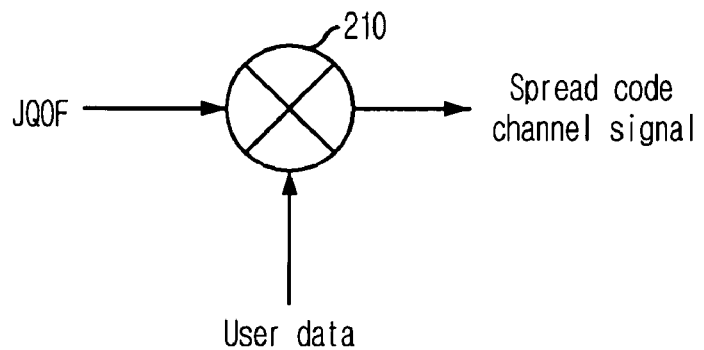
FIG. 2 is a diagram describing a spreading block in accordance with the embodiment of the present invention.

FIG. 2 is a diagram describing a spreading block in accordance with the embodiment of the present invention. As shown, the spreading block 200 suggested in the present invention can be realized by using a Hadamard product operator 210. This means that a spreading code channel signal can be acquired by inputting the JQOF and user data into the Hadamard product operator 210 and performing operation.

Figure 3:
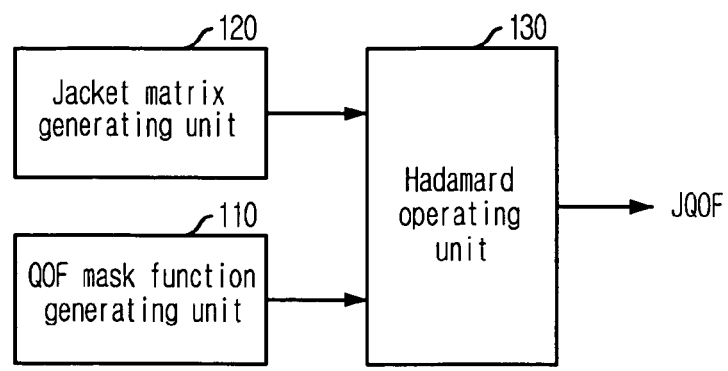
FIG. 3 is a block diagram illustrating a Jacket Quasi-Orthogonal Function (JQOF) generating block in accordance with the embodiment of the present invention.

FIG. 3 is a block diagram illustrating a JQOF generating block in accordance with the embodiment of the present invention. As shown, the JQOF generating block 100 includes a jacket matrix generating unit 120 for generating a jacket matrix, a Quasi-Orthogonal Function (QOF) mask function generating unit 110 for generating a QOF mask function, and a Hadamard operating unit 130 for generating a JQOF by receiving the jacket matrix generated in the jacket matrix generating unit 120 and the QOF mask function generated in the QOF mask function generating unit 110. As describe above, the JQOF generated in the Hadamard operating unit 130 is sent to the spreading block 200 and used as a spreading signal. The operation and theoretical background of the constitutional elements will be described in detail hereafter with reference to the drawings.

Figure 4:
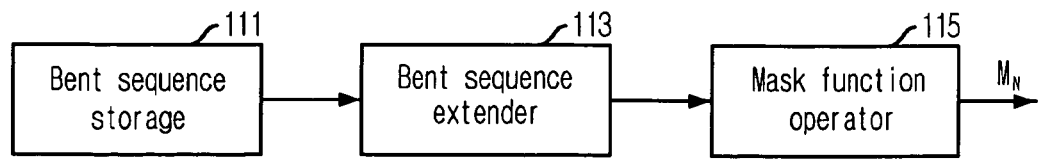
FIG. 4 is a block diagram describing a Quasi-Orthogonal Function (QOF) mask function generating block in accordance with the embodiment of the present invention.

FIG. 4 is a block diagram describing a QOF mask function generating block in accordance with the embodiment of the present invention. As shown, the QOF mask function generating unit 110 includes a bent sequence storage 111 for storing a known short bent sequence, a bent sequence extender 113 for generating a long bent sequence by receiving the short bent sequence and using a simple iteration function, and a mask function operator 115 for generating a mask function by receiving the long bent sequence.

The bent sequence extender 113 generates a long bent sequence having a desired length by receiving the known short bent sequence $(a_4, b_{n/4})$ stored in the bent sequence storage 111 and easily spreading it based on a simple iteration function and an equation 1, which is expressed as:

$$b_N = (a_4 \otimes b_{N/4}) \qquad \text{Eq. 1}$$

where $a_4$ and $b_{n/4}$ are known bent sequences; and $\otimes$ denotes a Kronecker operation.

A conventional QOF using the Hadamard matrix is generated as an equation 2 below. The JQOF in accordance with the present invention is also generated based on the QOF mask function.

$$Q_N = H_N \circ M_N \qquad \text{Eq. 2}$$

where $H_N$ denotes an N*N Hadamard matrix; $M_N$ denotes a QOF mask function; and $\circ$ denotes Hadamard operation.

The QOF mask function operator 115 generates a QOF mask function ($M_N$) by receiving the long bent sequence having a desired length which is inputted from the bent sequence spreader 113 and performing the operation of an equation 3.

$$M_N = \{b_{N/2}, (-i) \times \text{Reverse}(b_{N/2})\} \qquad \text{Eq. 3}$$

where $b_{N/2}$ denotes a bent sequence having a length of N/2; and $i = \sqrt{-1}$.

The cross-correlation of the above sequence is as shown in an equation 4.

$$R_{ab} \leq \sqrt{N} \qquad \text{Eq. 4}$$

where $a, b \in \{Q_N\}$ is a sequence and a shifted case is not considered herein, and if there is a shift in the QOF designed based on the equation 2, the peak value of the sequence becomes N.

Figure 5:
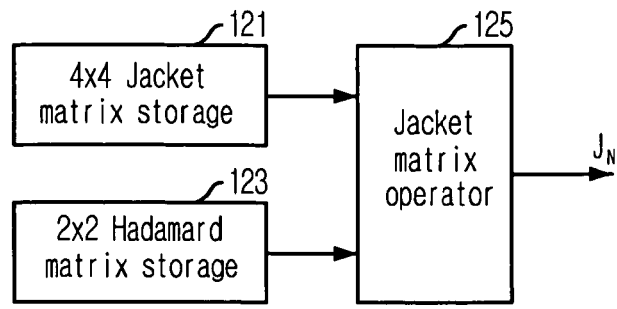
FIG. 5 is a block diagram showing jacket matrix generating block in accordance with the embodiment of the present invention.

FIG. 5 is a block diagram showing jacket matrix generating block in accordance with the embodiment of the present invention. As shown, the jacket matrix generating unit 120 of the present invention includes a 4×4 jacket matrix storage 121 for storing a 4×4 jacket matrix, a 2×2 Hadamard matrix storage 123 for storing a 2×2 Hadamard matrix, and a jacket matrix operator 125 for generating a jacket matrix by operating the 4×4 jacket matrix inputted from the 4×4 jacket matrix storage 121 and the 2×2 Hadamard matrix inputted from the 2×2 Hadamard matrix storage 123.

As described above, the JQOF can be obtained by performing Hadamard operation on the QOF mask function and the jacket matrix. It can be expressed as an equation 5 below.

$$JQ_N = J_N \circ M_N \qquad \text{Eq. 5}$$

where $J_N$ is an N×N jacket matrix; $M_N$ denotes a QOF mask function; and $\circ$ denotes Hadamard operation.

The jacket matrix operator 125 generates a jacket matrix ($J_N$) having a desired size (N) by using the 4×4 jacket matrix and the 2×2 Hadamard matrix inputted from the jacket matrix storage 121 and the 2×2 Hadamard matrix storage 123 and repeating the operation of an equation 6.

$$J_N = J_{N/2} \otimes H_2 \qquad \text{Eq. 6}$$

$$\text{where } J_4 = \begin{bmatrix} 1 & 1 & 1 & 1 \\ 1 & -i & i & -1 \\ 1 & i & -i & -1 \\ 1 & -1 & -1 & 1 \end{bmatrix}, H_2 = \begin{bmatrix} 1 & 1 \\ 1 & -1 \end{bmatrix}.$$

Figure 6:
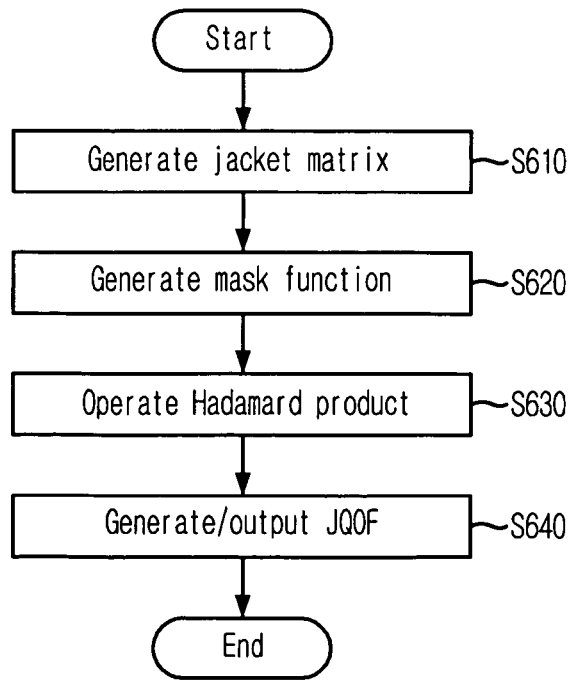
FIG. 6 is a flowchart describing a JQOF generating process in accordance with an embodiment of the present invention.

FIG. 6 is a flowchart describing a JQOF generating process in accordance with an embodiment of the present invention. First, at step S610, a jacket matrix ($J_N$) having a predetermined size (N) is generated in the jacket matrix generating unit 120 and, at step S620, a mask matrix ($M_N$) having a predetermined size (N) is generated in the QOF mask function generating unit 110.

Subsequently, at step S630, the Hadamard operating unit 130 receives the jacket matrix ($J_N$) and the mask matrix ($M_N$) and performs Hadamard operation based on the equation 5 and, at step S640, a JQOF is generated and outputted.

Figure 7:
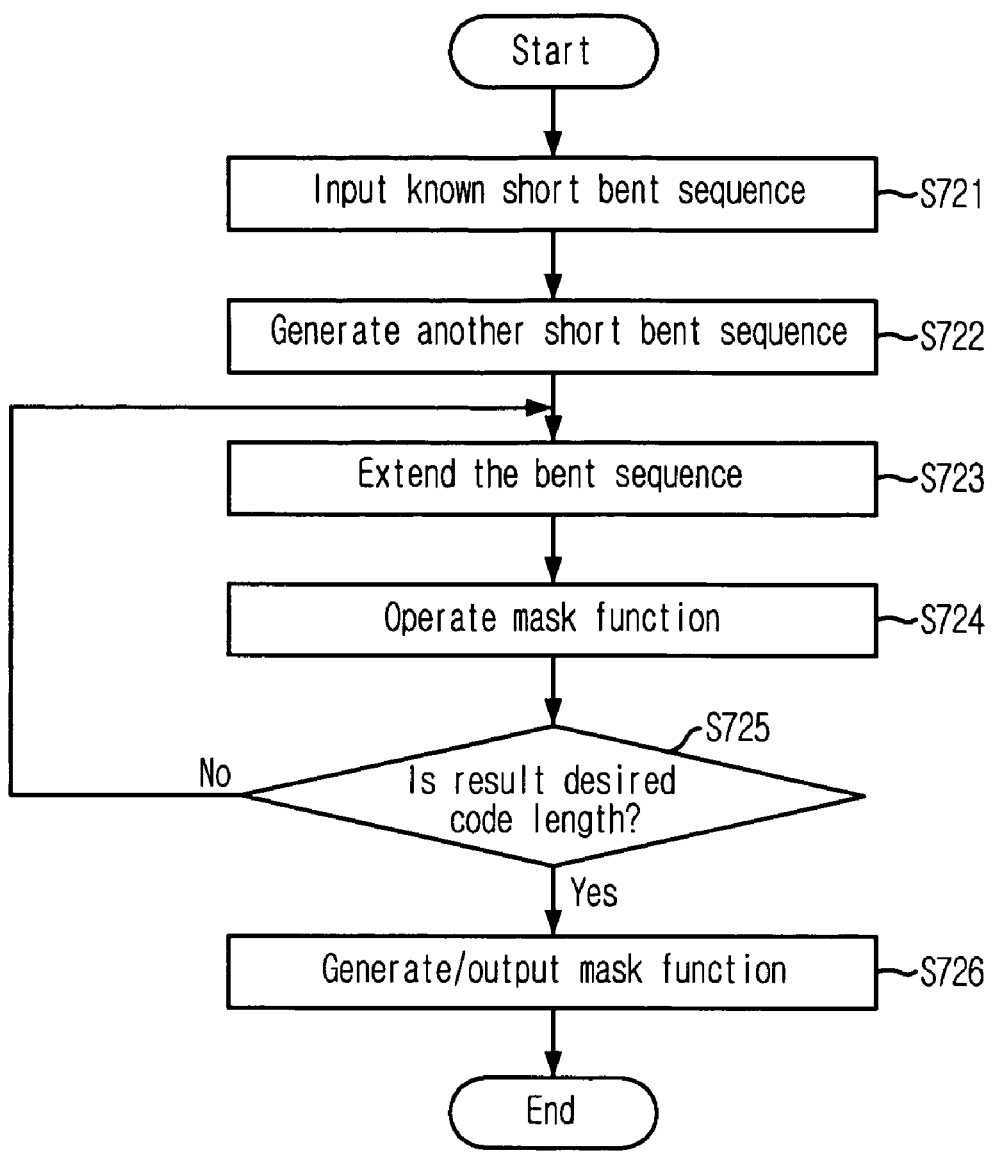
FIG. 7 is a flowchart illustrating a QOF mask function generating process in accordance with an embodiment of the present invention.

FIG. 7 is a flowchart illustrating a QOF mask function generating process in accordance with an embodiment of the present invention. First, at step S721, a known short bent sequence is inputted from the bent sequence storage 111 to the bent sequence extender 113. At step S722, complementary numbers to the inputted bent sequence are calculated and another short bent sequence is generated through a proper shift process.

Subsequently, at step S723, the short bent sequence is inputted and it is extended into a long bent sequence by performing a Kronecker operation based on the equation 1.

At step S724, the mask function operator 115 receives the long bent sequence and performs a mask function operation based on the equation 3.

At step S725, it is determined whether a resultant value obtained in the mask function operation is a desired code length.

If the resultant value is shorter than the desired code length, the operation from the step S723 is repeated. If it is the desired code length, a QOF mask function is generated and outputted in the resultant value.

FIG. 8 is a flowchart illustrating a jacket matrix generating process in accordance with an embodiment of the present invention. First, at step S811, a known 2×2 Hadamard matrix is inputted from the jacket matrix operator 125. At step S812, a 4×4 jacket matrix ($J_4$) is inputted and allocated to a variable $J_N$.

Subsequently, at step S813, a Kronecker operation is performed between the jacket matrix ($J_N$) and the Hadamard matrix ($H_2$) based on the equation 6.

At step S814, it is determined whether the resultant value of the Kronecker operation has reached a matrix of a desired size.

If the resultant value does not reach the desired size, the operations from the step S813 are repeated. If the resultant value has reached the desired size, a jacket matrix is generated and outputted based on the resultant value of the Kronecker operation.

FIG. 9 presents a JQOF structure in accordance with an embodiment of the present invention. The drawing shows an exemplary structure of a jacket QOF having a length of 8. The jacket matrix can be defined as follows in accordance with an embodiment of the present invention.

Definition 1

An inverse matrix for an N-sized square matrix having elements without zero includes inverses and transposes on an element basis, which is shown in equations 7 and 8.

$$[J]_N = \begin{bmatrix} j_{0,0} & j_{0,1} & \cdots & j_{0,N-1} \\ j_{1,0} & j_{1,1} & \cdots & j_{1,N-1} \\ \vdots & \cdots & \cdots & \vdots \\ j_{N-1,0} & j_{N-1,1} & \cdots & j_{N-1,N-1} \end{bmatrix} \quad \text{Eq. 7}$$

$$([J]_N^{-1})^T = \frac{1}{C} \begin{bmatrix} (j_{0,0})^{-1} & (j_{0,1})^{-1} & \cdots & (j_{0,N-1})^{-1} \\ (j_{1,0})^{-1} & (j_{1,1})^{-1} & \cdots & (j_{0,N-1})^{-1} \\ \vdots & \cdots & \cdots & \vdots \\ (j_{N-1,0})^{-1} & (j_{N-1,1})^{-1} & \cdots & (j_{N-1,N-1})^{-1} \end{bmatrix}^T \quad \text{Eq. 8}$$

where C denotes a normalizing constant; and T denotes a transpose of a matrix.

As described above, the jacket matrix can be acquired by using an iteration function as shown in an equation 9 below.

$$[J]_N = [J]_{N/2} \otimes [H]_2, \quad N > 4 \quad \text{Eq. 9}$$

$$\text{where } [J]_4 = \begin{bmatrix} 1 & 1 & 1 & 1 \\ 1 & -i & i & -1 \\ 1 & i & -i & -1 \\ 1 & -1 & -1 & 1 \end{bmatrix}, [H]_2 = \begin{bmatrix} 1 & 1 \\ 1 & -1 \end{bmatrix},$$

and $\otimes$ denotes Kronecker operation.

From the equation 9, it can be seen that the jacket matrix is an orthogonal matrix. Thus, as described above with reference to the equation 6, a jacket quasi-orthogonal sequence can be generated as an equation 10.

$$JQ_N = [J]_N \circ M_N \quad \text{Eq. 10}$$

The cross-correlation between two arbitrary signals that belong to different QOF sets has a predetermined size, and the minimum cross-correlation for a Walsh function is $\sqrt{N}$. Consequently, difference exists only in the center of a sequence set between ordinary QOFs obtained from the JQOF matrix and the Hadamard matrix. A jacket matrix can be used as a basic code to acquire low cross-correlation, instead of a Walsh code.

Also, the present invention uses a simple iteration function to generate QOF mask functions having a different length, as described above. A basic QOF mask function for forming the iteration function considers a bent sequence. A list of bent sequences having a length of 4 is shown in a table 1 below.

TABLE 1

|  | a: +++− | −a: −−−+ |
|---|---|---|
| Shift 1: | ++−+ | −−+− |
| Shift 2: | +−++ | −+−− |
| Shift 3: | −+++ | +−−− |

When a QOF mask function is given as {1 1− 1− 1− j j j −j}, it means that the QOF mask function includes two bent sequences: One is {1 −1 −1 −1}, and the other is −j×{1 −1 −1 −1}.

Therefore, forming a QOF mask function is the same as looking for another bent sequence. A bent sequence is generally acquired from orthogonal transform, such as Hadamard transform. When transform of N-long Hadamard with respect to a vector $a_N$ is $D_N$, $D_N$ can be expressed as an equation 11 below. This teaching is revealed in an article by M. G. Parker and Moon-Ho Lee, entitled "Optimal bipolar sequences for the complex reverse-jacket transform," *International Symposium on Information Theory and Its Application (ISITA 2000)*, Honolulu, Hi., U.S.A., Nov. 5-8, 2000, pp. 617-621.

$$D_N = [H]_N a_N \quad \text{Eq. 11}$$

where $N=2^t$, $t\in\{1, 2, \ldots\}$; and $[H]_n$ is an N×N Hadamard matrix. The equation 11 is based on a book by R. K. Yarlagadda and John E. Hershey, entitled *Hadamard Matrix Analysis and Synthesis with Applications to Communications and Signal Image Processing*, Kluwer Academic Publishers, U.S., 1997, and a book by S. S. Agaian, entitled *Hadamard Matrices and Their Applications*, Lecture Notes in Mathematics, Springer-Verlag, Berlin, Germany, 1980.

$$[H]_N = [H]_{N/2} \otimes [H]_2, \; N \geq 4 \quad \text{Eq. 12}$$

where $\otimes$ denotes Kronecker operation; and $$[H]_2 = \begin{bmatrix} 1 & 1 \\ 1 & -1 \end{bmatrix}.$$

Definition 2

A unimodular sequence is described as 'bent' if it has a peak factor of 1 under the Hadamard transform, i.e., it has a Hadamard Peak Factor (HPF) of 1.

Definition 3

The HPF of $a_N$ is defined as an equation 13 below.

$$HPF(a_N) = \frac{1}{N} \max\{D_N \circ D_N^*\} \quad \text{Eq. 13}$$

where $\circ$ denotes Hadamard operation; and $D_n^*$ is a conjugate of $D_n$.

According to the equation 13, if $a_N$ is unimodular, $1 \leq HPF(a_N) \leq N$. This signifies that unimodular means that each element has a magnitude of $a_N$ is 1, which is revealed in an article by M. G. Parker and Moon-ho Lee, entitled "Optimal bipolar sequences for the complex reverse-jacket transform," *International Symposium on Information Theory and Its Application*, Honolulu, Hi., U.S.A., Nov. 5-8, 2000, pp. 617-621.

For example, when it is assumed that thee is a binary sequence $a_4=(1\ 1\ -1\ 1)$, HPF is obtained based on the following steps.

Step 1:

$$D = [H]_4 a = \begin{bmatrix} 1 & 1 & 1 & 1 \\ 1 & -1 & 1 & -1 \\ 1 & 1 & -1 & -1 \\ 1 & -1 & -1 & 1 \end{bmatrix} = [2\ -2\ 2\ 2]$$

Step 2:

$$D \circ D^* = [4\ 4\ 4\ 4]$$

Step 3:

$$HPF(a_4) = \frac{1}{4} \max\{D_4 \circ D_4^*\} = 1$$

Therefore, the binary sequence $a_4=(1\ 1\ -1\ 1)$ is a bent sequence.

The properties of the bent sequence are as follows. If $a_N$ is a bent sequence, shifts of $a_N$ are bent sequences, too. Also, if $a_N$ is a bent sequence, its binary complementary numbers $-a_N$, too, is a bent sequence as well.

Based on the properties, an iteration function for the bent sequence can be spread in a simple manner as expressed in an equation 14.

$$\begin{aligned} D_N &= [H]_N(a_4 \otimes b_{N/4}) \\ &= ([H]_4 \otimes [H]_{N/4})(a_4 \otimes b_{N/4}) \\ &= ([H]_4 a_4) \otimes ([H]_{N/4} \cdot b_{N/4}) \end{aligned} \quad \text{Eq. 14}$$

Based on the equation 14, an equation 15 can be obtained.

$$\max(|D_N|) = \max([H]_4 a_4) \times \max([H]_{N/4} b_{N/4}) \quad \text{Eq. 15}$$

This is operation of HPF of $a_4$ and HPF related to $b_{n/4}$ For example, when $b_{N/R}=a_4$ wherein $N=16$ and $a_4$ is a bent sequence, an equation 16 can be acquired as follows.

$$\begin{aligned} D_{16} &= [H]_{16}(a_4 \otimes b_4) \\ &= ([H]_4 a_4) \otimes ([H]_4 a_4) \\ &= ([H]_4 a_4) \otimes D_4 \end{aligned} \quad \text{Eq. 16}$$

Therefore, $\max(|D_{16}|) = \max(|D_4|) \times \max(|D_4|) = 2 \times 2 = 4$ and this can be expressed as an equation 17 eventually.

$$HPF(a_4 \otimes a_4) = (4 \times 4)/16 = 1 = HPF(D_{16}) \quad \text{Eq. 17}$$

A table 2 below presents a bent sequence having a length of 16, which is obtained from the bent sequence having a length of 4.

TABLE 2

| Construction $a \oplus b$ | Length-16 bent sequences | max\|D$_4$\| | max\|D$_{16}$\| | HPF |
|---|---|---|---|---|
| {+++−} ⊕ {+++−} | +++−+++−+++−−−−+ | 2 | 2 × 2 = 4 | 1 |
| {+++−} ⊕ {−+++} | −+++−+++−++++++−−− | 2 | 2 × 2 = 4 | 1 |
| {+++−} ⊕ {−−−+} | −−−+−−−+−−−++++− | 2 | 2 × 2 = 4 | 1 |
| {+++−} ⊕ {+−−−} | +−−−+−−−+−−−+++ | 2 | 2 × 2 = 4 | 1 |

Generally, when $b_{N/4}$ and $a_4$ have the lowest HPF, a sequence $a_4 \otimes b_{N/4}$ has the lowest HPF. A high-degree bent sequence can be obtained by performing Kronecker operation and shift with respect to two low-degree bent sequences and using complementary number properties.

A table 4 shows several bent sequences having a length of 16, which is obtained by using an iteration method. After all, as described with reference to the equation 3, a QOF mask function can be obtained in the following form:

$$M_N = \{b_{N/2}, (-j) \times b_{N/2}\}$$

where $b_N$ is a bent sequence having a length of N.

FIGS. 10A to 10D are graphs describing JQOF cross-correlation properties in accordance with an embodiment of the present invention. The drawings show examples of the cross-correlation properties between a fourth-degree jacket quasi-orthogonal sequence and a general sequence.

Figure 10A:
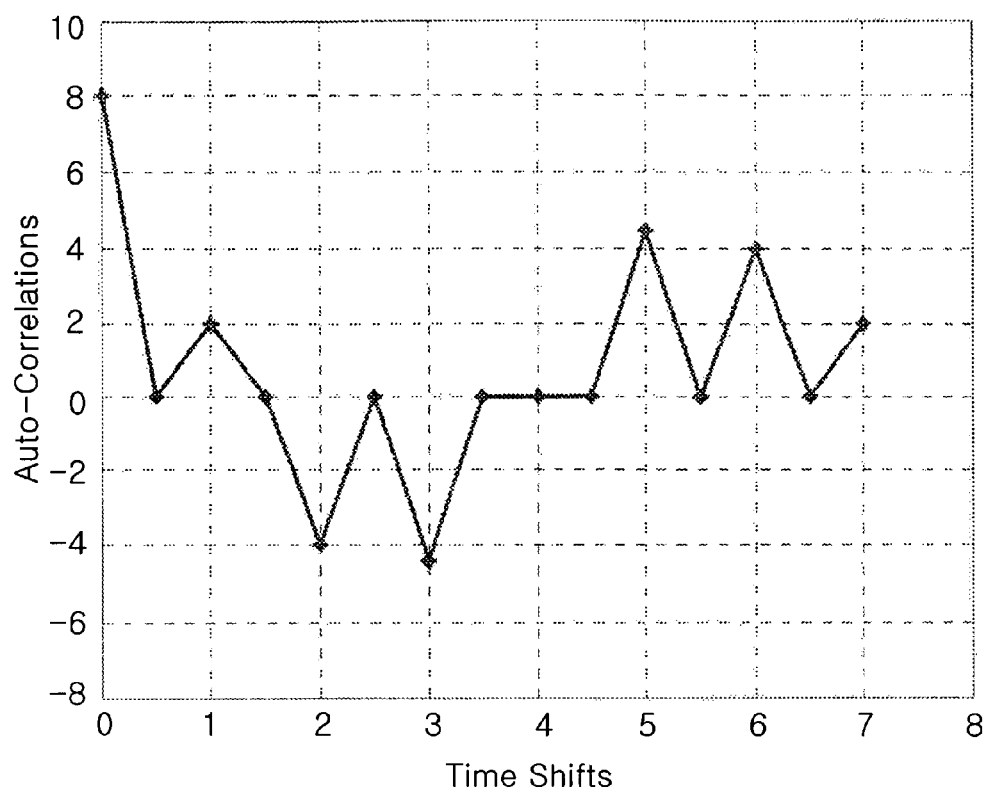
FIGS. 10A to 10D are graphs describing JQOF cross-correlation properties in accordance with an embodiment of the present invention.
Figure 10B:
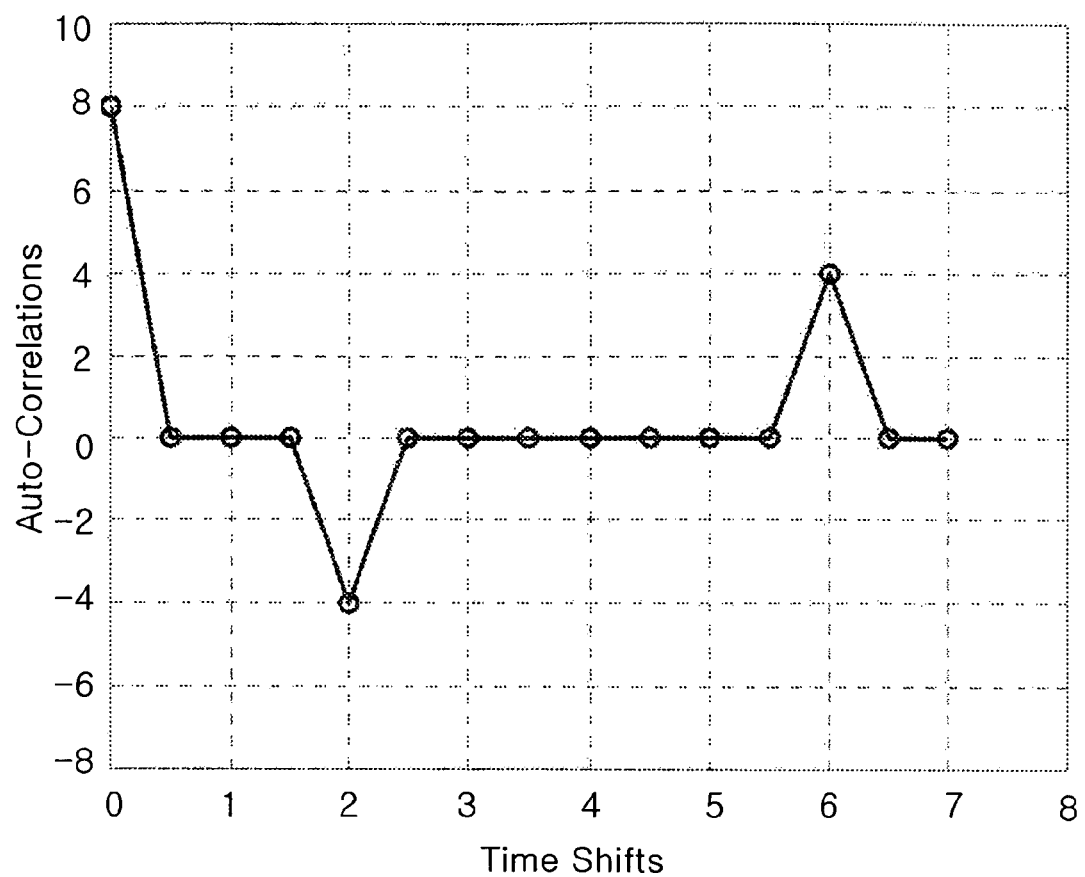
Figure 10C:
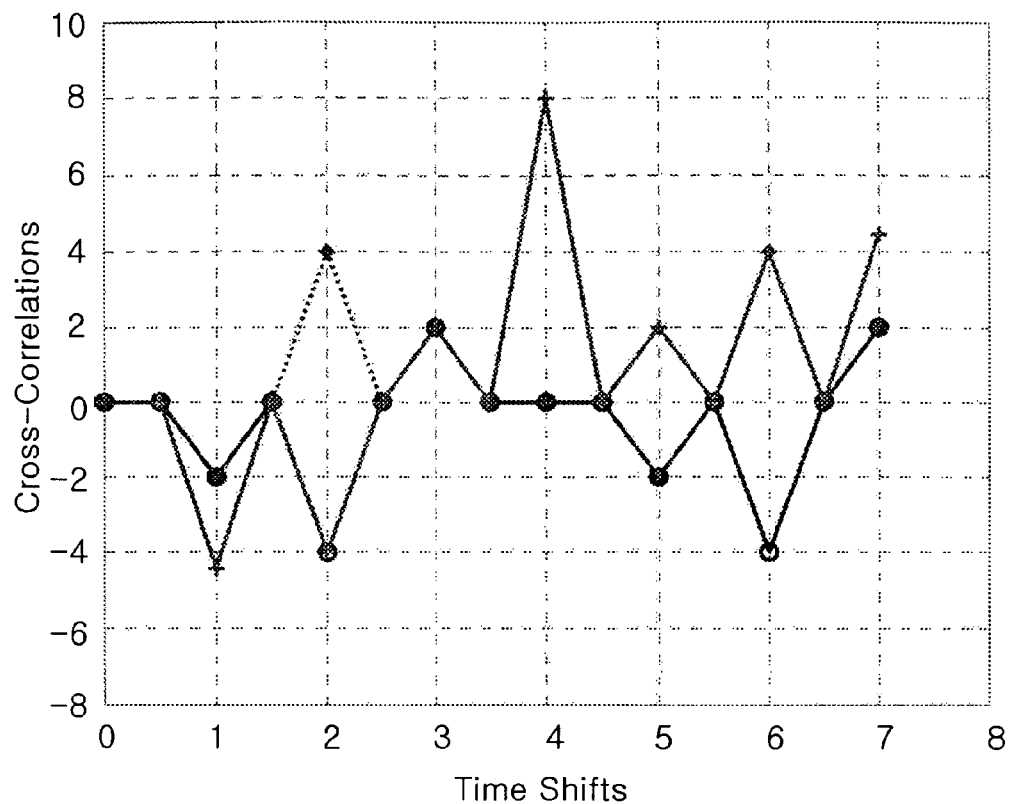
Figure 10D:
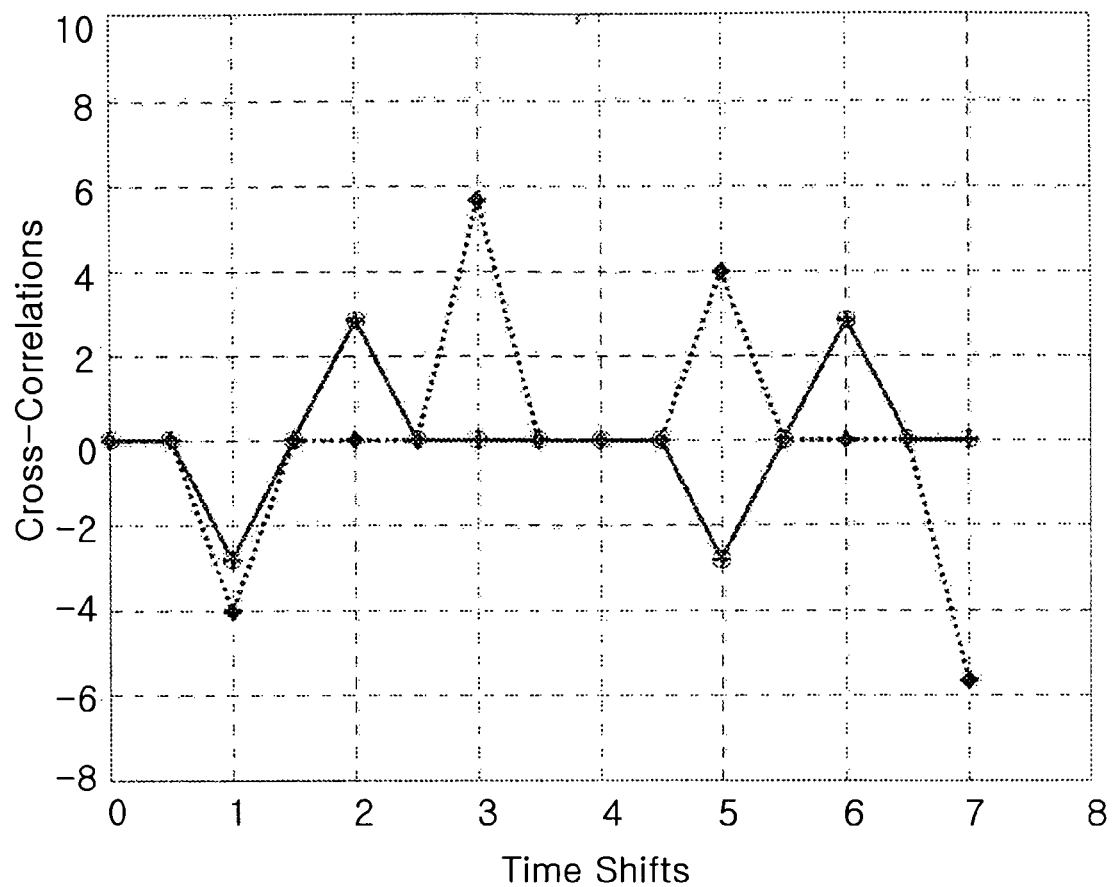

FIG. 10A shows auto-correlation properties of a QOF having a length of 8, which is induced in a Hadamard matrix, and FIG. 10B presents auto-correlation properties of a JQOF having a length of 8 induced in a jacket matrix. FIG. 10C shows cross-correlation properties of a QOF having a length of 8 in a Hadamard matrix, and FIG. 10D presents auto-correlation properties of a JQOF having a length of 8 induced in a jacket matrix. From the drawings, it can be seen that the JQOF sequence of the present invention has an average cross-correlation lower than a general QOF does.

In order to compare the JQOF of the present invention with the general QOF, useful criterion is needed. Generally, periodic auto-correlation of a sequence can be defined as an equation 18.

$$R_a(\tau) = \sum_{i=0}^{N-1} a_i a^*_{(i+\tau) \bmod N} \quad \text{Eq. 18}$$

Also, the periodic cross-correlation can be defined as an equation 19 below.

$$C_{ab}(\tau) = \sum_{i=0}^{N-1} a_i b^*_{(i+\tau) \bmod N} \quad \text{Eq. 19}$$

where $a_i$ and $b_i$ are $i^{th}$ elements of sequences a and b, respectively; N denotes the length of the sequences a and b; and $\tau(JQ_N = J_N \circ M_N)$ denotes a shift coefficient.

TABLE 4

| | Merit Factor $F_a$ Conventional Quasi-orthogonal on Hadamard | Merit Factor $F_a$ Proposed Quasi-orthogonal on Jacket |
|---|---|---|
| f1 | 0.05 | 0.05 |
| f2 | 0.05 | 0.05 |
| f3 | 0.05 | 0.125 |
| f4 | 0.05 | 0.125 |
| f5 | 0.05 | 0.125 |
| f6 | 0.05 | 0.125 |
| f7 | 0.05 | 0.05 |
| f8 | 0.05 | 0.05 |
| Average | 0.05 | 0.1 |

The table 4 shows merit factors obtained from a JQOF having a length of 8.

From the above numerical analysis, it can be seen that the JQOF proposed in the present invention has larger merit factors than a conventional QOF. This result is very useful for designing an optical receiver in a third generation (3G) Code Division Multiple Access (CDMA) system.

TABLE 3

| | Auto-correlations | | Inner cross-correlations (Cross-correlation in the same QOF set) | | Cross-Correlations within Walsh Functions | |
|---|---|---|---|---|---|---|
| | Quasi-orthogonal on Hadamard | Quasi-orthogonal on jacket | Quasi-orthogonal on Hadamard | Quasi-orthogonal on jacket | Quasi-orthogonal on Hadamard | Quasi-orthogonal on jacket |
| Maximum side-lobe values | 4 | 4 | 4 | 4 | $\sqrt{8}$ | $\sqrt{8}$ |
| Number of maximum side-lobe values | 2 | 2 | 6 | 6 | The cross-correlations have constant magnitude | The cross-correlations have constant magnitude |
| Number of zeros | 1 | 5 | 21 | 28 | | |

The table 3 presents a numerical analysis result showing cross-correlation properties by a quasi-orthogonal sequence having a length of 8. The result shows that the JQOF of the present invention has superior cross-correlation properties to general QOF induced from the Hadamard matrix.

Another important parameter used for synchronization and access of a spreading sequence is a merit factor (merit factor [ ]), which indicates a ratio of main lob energy and side lobe energy of an auto-correlation function. The merit factor is expressed as an equation 20 below.

$$F_a = \frac{R_a(0)}{2 \sum_{\tau=1}^{N-1} |R_a(\tau)|^2} \quad \text{Eq. 20}$$

Figure 11:
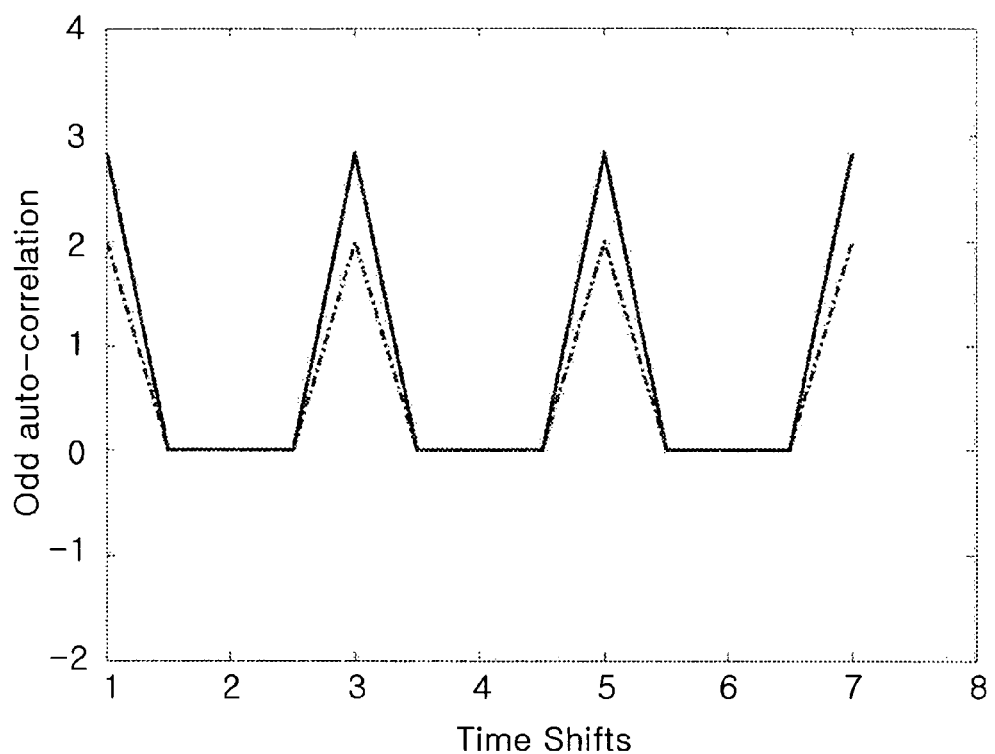
FIG. 11 is a graph showing odd auto-correlation properties of JQOF in accordance with an embodiment of the present invention.

FIG. 11 is a graph showing odd auto-correlation properties of JQOF in accordance with an embodiment of the present invention.

In order to examine a possibility of applying a quasi-orthogonal sequence in an asynchronous system, an odd auto-correlation function should be studied. The odd auto-correlation function is defined as an equation 21 below.

$$\theta_a(\tau) = C_a(\tau) - C_a(\tau - N) \quad \text{Eq. 21}$$

where $C_a(\tau)$ is aperiodic auto-correlation function.

The aperiodic auto-correlation function can be defined as an equation 22 below.

$$C_a(\tau) = \begin{cases} \sum_{i=0}^{N-1-\tau} a_i(a_{i+\tau})^* & \text{for } 0 \leq \tau \leq N-1 \\ \sum_{i=0}^{N-1+\tau} a_{i-\tau}(a_i)^* & \text{for } 1-N \leq \tau < 0 \\ 0 & \text{for } |\tau| \geq N \end{cases} \quad \text{Eq. 22}$$

Figure 12:
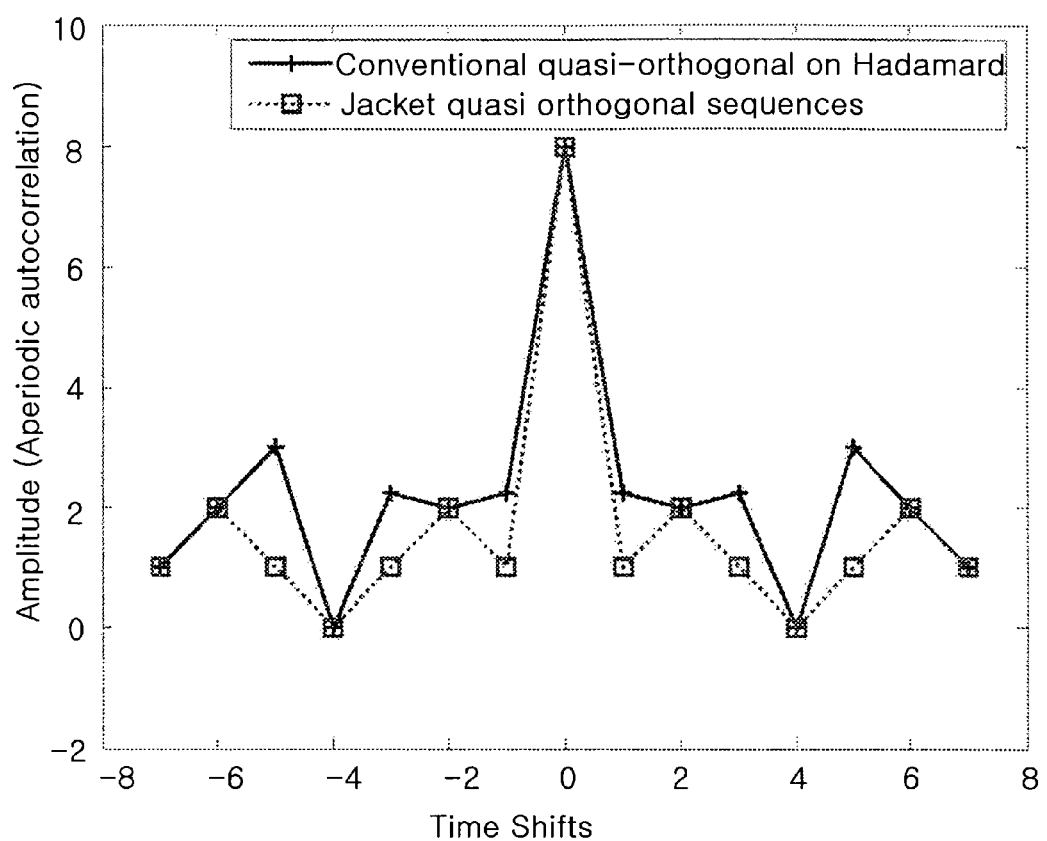
FIG. 12 is a graph illustrating aperiodic auto-correlation properties of JQOF in accordance with an embodiment of the present invention.

FIG. 12 is a graph illustrating aperiodic auto-correlation properties of JQOF in accordance with an embodiment of the present invention. As shown in FIG. 12, THE JQOF aperiodic auto-correlation can be improved by approximately 30 percent, compared to a conventional QOF.

Also, the odd auto-correlation for the JQOF becomes $1/\sqrt{2}$ of odd auto-correlation for a conventional QOF always, that is, in any cases.

The method of the present invention described in the above can be embodied as a program and stored in a computer-readable recording medium, such as CD-ROM, RAM, ROM, floppy disks, hard disks, and magneto-optical disks. Since the process can be easily implemented by those skilled in the art of the present invention, no further description on it will be provided herein.

The present invention provides an apparatus for generating a spread quasi-orthogonal function, which is a spreading signal, by using a jacket sequence and a known short bent sequence, a method thereof, and a code channel spreading device that can obtain the minimum transmission power and an excellent multiple access error probability in a multi-user system, such as the CDMA system, by using the spread quasi-orthogonal function generating apparatus.

Also, the present invention can provide a simple QOF generating method having a low level of cross-correlation in a jacket matrix, a method for generating a variety of QOF mask function families by simply spreading the known short bent sequence into a long bent sequence, and a code channel spreading device that can increase the number of available code channels without modifying a conventional code spreading device.

Also, the present invention can provide a spreading code having superior cross-correlation properties to an existing spreading code.

Also, the technology of the present invention can spread the known shot bent sequence into a long bent sequence in a simple manner to generate a QOF mask function and it can provide diverse QOF mask function families having superior properties to the IS-2000 Standards.

In addition, the present invention can easily calculate a family of JQOF sequence for acquiring the minimum transmission power and a fine multiple access error probability in the CDMA system by combining properties of a QOF sequence, and it can provide a spreading device having a simple structure that can support diverse levels of speed on a user basis in the multi-user communication environment having different requirements.

The present application contains subject matter related to Korean patent application Nos. 2005-09332 and 2005-20876, filed in the Korean Intellectual Property Office on Feb. 2, 2005, and Mar. 14, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A code channel spreading device comprising:
   a spreading code generating unit implemented by a microprocessor or a logical circuit and configured to generate a spreading code by using a jacket matrix; and
   a spreading unit implemented by a microprocessor or a logical circuit and configured to spread external user data by using the spreading code generated in the spreading code generating unit to thereby generate a spreading code channel signal to be transmitted to a receiver,
   wherein the jacket matrix $[J]_N$ is an orthogonal square matrix of a predetermined size N and having non-zero elements as defined below:

$$[J]_N = \begin{bmatrix} j_{0,0} & j_{0,1} & \Lambda & j_{0,N-1} \\ j_{1,0} & j_{1,1} & \Lambda & j_{1,N-1} \\ M & \Lambda & \Lambda & M \\ j_{N-1,0} & j_{N-1,1} & \Lambda & j_{N-1,N-1} \end{bmatrix}; \text{ and}$$

wherein the jacket matrix further satisfies the following equation:

$$([J]_N^{-1})^T = \frac{1}{C} \begin{bmatrix} (j_{0,0})^{-1} & (j_{0,1})^{-1} & \Lambda & (j_{0,N-1})^{-1} \\ (j_{1,0})^{-1} & (j_{1,1})^{-1} & \Lambda & (j_{1,N-1})^{-1} \\ M & \Lambda & \Lambda & M \\ (j_{N-1,0})^{-1} & (j_{N-1,1})^{-1} & \Lambda & (j_{N-1,N-1})^{-1} \end{bmatrix}^T$$

where C denotes a normalizing constant.

2. The code channel spreading device as recited in claim 1, wherein the spreading code is a Jacket Quasi-Orthogonal Function (JQOF) using the jacket matrix.

3. The code channel spreading device as recited in claim 2, wherein the spreading unit comprises a Hadamard product operator for generating a code channel signal spread from the JQOF and the user data.

4. The code channel spreading device as recited in claim 2, wherein the spreading code generating unit includes:
   a jacket matrix generating unit configured to generate the jacket matrix;
   a mask function generating unit configured to generate a mask function; and
   a Hadamard operating unit configured to generate the JQOF by performing a Hadamard operation on the jacket matrix and the mask function generated in the jacket matrix generating unit and the mask function generating unit, respectively.

5. The code channel spreading device as recited in claim 4, wherein the mask function generating unit includes:
   a bent sequence storing unit configured to store a short bent sequence;
   a bent sequence spreading unit for configured to generate a long bent sequence of a predetermined length by performing a simple iteration function on the short bent sequence; and
   a mask function operating unit configured to generate the mask function from the long bent sequence.

6. The code channel spreading device as recited in claim 5, wherein the bent sequence spreading unit is configured to generate the long bent sequence using the following equation:

$$b_N = (a_4 \otimes b_{N/4})$$

where $a_4$ and $b_{N/4}$ are the short bent sequences;
   $b_N$ denotes the long bent sequence; and
   $\otimes$ denotes a Kronecker operation.

7. The code channel spreading device as recited in claim 6, wherein the mask function operating unit is configured to generate the mask function using the following equation:

$$M_N = \{b_{N/2}, (-i) \times \text{Reverse}(b_{N/2})\}$$

where $M_N$ denotes the mask function;

$b_{N/2}$ denotes a bent sequence having a length of N/2; and $i = \sqrt{-1}$.

8. The code channel spreading device as recited in claim 4, wherein the jacket matrix generating unit includes:
- a unit jacket matrix storing unit configured to store a basic jacket matrix;
- a Hadamard matrix storing unit configured to store a basic Hadamard matrix; and
- a jacket matrix operating unit configured to generate a jacket matrix of a desired size by using the basic jacket matrix and the basic Hadamard matrix.

9. The code channel spreading device as recited in claim 8, wherein the basic jacket matrix and the basic Hadamard matrix are respectively expressed as:

$$[J]_4 = \begin{bmatrix} 1 & 1 & 1 & 1 \\ 1 & -i & i & -1 \\ 1 & i & -i & -1 \\ 1 & -1 & -1 & 1 \end{bmatrix} \text{ and } H_2 = \begin{bmatrix} 1 & 1 \\ 1 & -1 \end{bmatrix}.$$

10. The code channel spreading device as recited in claim 9, wherein the jacket matrix operating unit is configured to generate the jacket matrix of the desired size by repeating an operation based on the following equation:

$$J_N = J_{N/2} \otimes H_2$$

where $\otimes$ denotes a Kronecker equation.

11. A spreading code generating apparatus, comprising:
- a jacket matrix generating unit implemented by a microprocessor or a logical circuit and congfigured to generate a jacket matrix;
- a mask function generating unit implemented by a microprocessor or a logical circuit and configured to generate a mask function; and
- a Hadamard operating unit implemented by a microprocessor or a logical circuit and configured to generate a spreading code by performing a Hadamard operation on the jacket matrix and the mask function generated in the jacket matrix generating unit and the mask function generating unit, respectively,
- wherein the jacket matrix $[J]_N$ is an orthogonal square matrix of a predetermined size N and having non-zero elements as defined below:

$$[J]_N = \begin{bmatrix} j_{0,0} & j_{0,1} & \Lambda & j_{0,N-1} \\ j_{1,0} & j_{1,1} & \Lambda & j_{1,N-1} \\ M & \Lambda & \Lambda & M \\ j_{N-1,0} & j_{N-1,1} & \Lambda & j_{N-1,N-1} \end{bmatrix}; \text{ and}$$

wherein the jacket matrix further satisfies the following equation:

$$([J]_N^{-1})^T = \frac{1}{C} \begin{bmatrix} (j_{0,0})^{-1} & (j_{0,1})^{-1} & \Lambda & (j_{0,N-1})^{-1} \\ (j_{1,0})^{-1} & (j_{1,1})^{-1} & \Lambda & (j_{1,N-1})^{-1} \\ M & \Lambda & \Lambda & M \\ (j_{N-1,0})^{-1} & (j_{N-1,1})^{-1} & \Lambda & (j_{N-1,N-1})^{-1} \end{bmatrix}^T$$

where C denotes a normalizing constant.

12. The spreading code generating apparatus as recited in claim 11, wherein the spreading code is a Jacket Quasi-Orthogonal Function (JQOF) using the jacket matrix.

13. The spreading code generating apparatus as recited in claim 12, wherein the mask function generating unit includes:
- a bent sequence storing unit configured to store a short bent sequence;
- a bent sequence spreading unit configured to generate a long bent sequence of a predetermined length by performing a simple iteration function on the short bent sequence; and
- a mask function operating unit configured to generate the mask function from the long bent sequence.

14. The spreading code generating apparatus as recited in claim 13, wherein the bent sequence spreading unit is configured to generate the long bent sequence using the following equation:

$$b_N = (a_4 \otimes b_{N/4})$$

where $a_4$ and $b_{N/4}$ are the short bent sequences;

$b_N$ denotes the long bent sequence; and $\otimes$ denotes a Kronecker operation.

15. The spreading code generating apparatus as recited in claim 14, wherein the mask function operating unit is configured to generate the mask function using the following equation:

$$M_N = \{b_{N/2}, (-i) \times \text{Reverse}(b_{N/2})\}$$

where $M_N$ denotes the mask function;

$b_{N/2}$ denotes a bent sequence having a length of N/2; and $i = \sqrt{-1}$.

16. The spreading code generating apparatus as recited in claim 11, wherein the jacket matrix generating unit includes:
- a unit jacket matrix storing unit configured to store a basic jacket matrix;
- a Hadamard matrix storing unit configured to store a basic Hadamard matrix; and
- a jacket matrix operating unit configured to generate a jacket matrix of a desired size by using the basic jacket matrix and the basic Hadamard matrix.

17. A computer-implemented method of spreading external user data, wherein said method comprises generating a spreading code by:
a) generating a jacket matrix;
b) generating a mask function; and
c) generating the spreading code from the jacket matrix and the mask function,
wherein said method further comprises spreading the external user data by using the spreading code;
wherein the jacket matrix $[J]_N$ is an orthogonal square matrix of a predetermined size N and having non-zero elements as defined below:

$$[J]_N = \begin{bmatrix} j_{0,0} & j_{0,1} & \Lambda & j_{0,N-1} \\ j_{1,0} & j_{1,1} & \Lambda & j_{1,N-1} \\ M & \Lambda & \Lambda & M \\ j_{N-1,0} & j_{N-1,1} & \Lambda & j_{N-1,N-1} \end{bmatrix}; \text{ and}$$

wherein the jacket matrix further satisfies the following equation:

$$([J]_N^{-1})^T = \frac{1}{C} \begin{bmatrix} (j_{0,0})^{-1} & (j_{0,1})^{-1} & \Lambda & (j_{0,N-1})^{-1} \\ (j_{1,0})^{-1} & (j_{1,1})^{-1} & \Lambda & (j_{1,N-1})^{-1} \\ M & \Lambda & \Lambda & M \\ (j_{N-1,0})^{-1} & (j_{N-1,1})^{-1} & \Lambda & (j_{N-1,N-1})^{-1} \end{bmatrix}^T$$

where C denotes a normalizing constant.

18. The method as recited in claim 17, wherein the spreading code, which is a Jacket Quasi-Orthogonal Function (JQOF) using the jacket matrix, is generated using the following equation.

$$JQ_N = J_N \circ M_N$$

where $J_N$ is an N×N jacket matrix;
$M_N$ denotes a QOF mask function; and
$\circ$ denotes a Hadamard operation.

19. The method as recited in claim 17, wherein the step b) includes the steps of:
b1) receiving a known short bent sequence;
b2) calculating numbers complementary to the received short bent sequence and generating another short bent sequence by a shift process;
b3) spreading the received short bent sequence into a long bent sequence by performing a Kronecker operation;
b4) calculating the mask function based on the long bent sequence;
b5) determining whether a value obtained from the mask function calculation is a desired code length;
b6) if the mask function calculation value is less than the desired code length, repeating steps b3) through b5); and
b7) if the mask function calculation value is the desired code length, outputting the mask function with the mask function calculation value that is the desired code length.

20. The method as recited in claim 18, wherein the step a) includes the steps of:
a1) receiving a basic Hadamard matrix;
a2) receiving a basic jacket matrix;
a3) performing a Kronecker operation on the basic Hadamard matrix and the basic jacket matrix;
a4) determining whether a value obtained from the Kronecker operation reaches a matrix of a desired size;
a5) if the Kronecker operation value does not reach the desired matrix size, allocating the Kronecker operation value to the basic jacket matrix and repeating the Kronecker operation; and
a6) if the Kronecker operation value reaches the desired matrix size, outputting the jacket matrix with the Kronecker operation value that reaches the desired matrix size.

21. The method as recited in claim 20, wherein the basic jacket matrix and the basic Hadamard matrix are respectively expressed as:

$$[J]_4 = \begin{bmatrix} 1 & 1 & 1 & 1 \\ 1 & -i & i & -1 \\ 1 & i & -i & -1 \\ 1 & -1 & -1 & 1 \end{bmatrix} \text{ and } H_2 = \begin{bmatrix} 1 & 1 \\ 1 & -1 \end{bmatrix}.$$

\* \* \* \* \*